J. A. EDEN, Jr.
CHUCK FOR STAYBOLT AND OTHER MACHINES.
APPLICATION FILED APR. 12, 1919.

1,361,571.

Patented Dec. 7, 1920.
2 SHEETS—SHEET 1.

INVENTOR
James A. Eden, Jr.
BY
, ATTORNEY

J. A. EDEN, Jr.
CHUCK FOR STAYBOLT AND OTHER MACHINES.
APPLICATION FILED APR. 12, 1919.
1,361,571.
Patented Dec. 7, 1920.
2 SHEETS—SHEET 2.
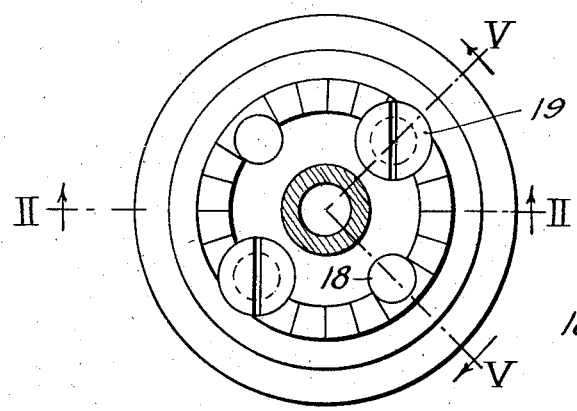
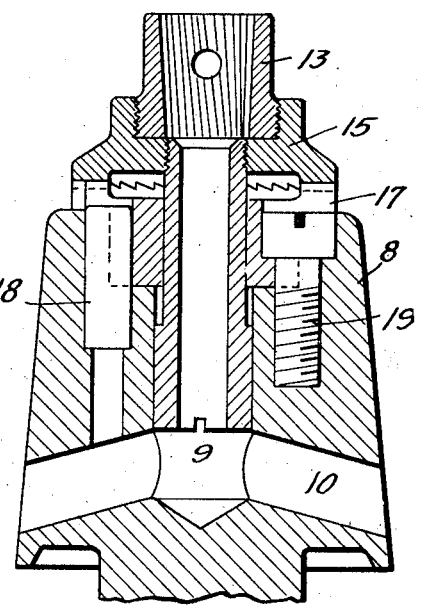
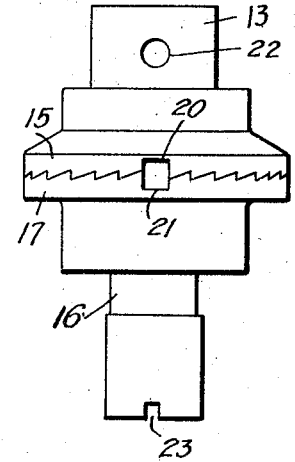
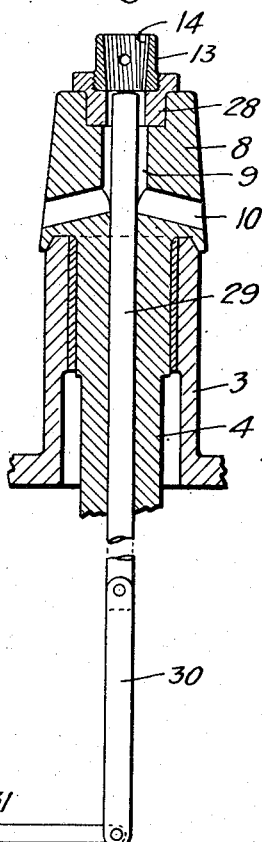
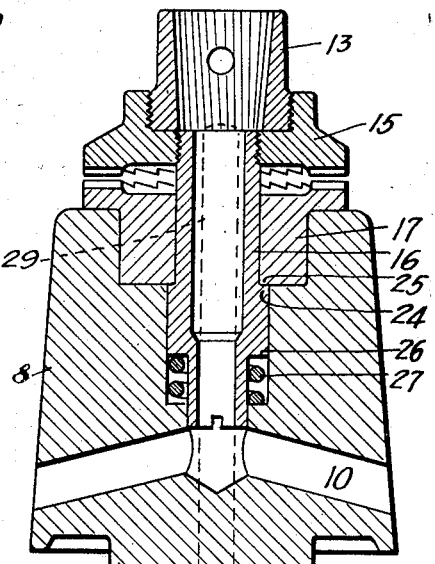
INVENTOR
James A. Eden, Jr.
BY
D. Anthony Usina, ATTORNEY

UNITED STATES PATENT OFFICE.

JAMES A. EDEN, JR., OF SPRINGFIELD, MASSACHUSETTS, ASSIGNOR TO WALTER H. FOSTER, OF NEW YORK, N. Y.

CHUCK FOR STAYBOLT AND OTHER MACHINES.

1,361,571.　　　　　Specification of Letters Patent.　　Patented Dec. 7, 1920.

Application filed April 12, 1919. Serial No. 289,614.

*To all whom it may concern:*

Be it known that I, JAMES A. EDEN, Jr., a citizen of the United States, residing in Springfield, Massachusetts, have invented certain new and useful Improvements in Chucks for Staybolt and other Machines, of which the following is a specification.

My invention aims to provide an improved style of chuck especially useful in machines for turning and threading staybolts, and applicable also to other turning and threading machines. The accompanying drawings illustrate embodiments of the invention.

Fig. 4 is a horizontal section on the line IV—IV of Fig. 3;

Fig. 5 is a section substantially on the broken line of V—V of Fig. 4;

Fig. 6 is a section similar to Fig. 3 illustrating a slight modification;

Fig. 7 is a similar section of another modification;

Fig. 8 is an elevation of the chuck removed from its driving member.

Figure 1:
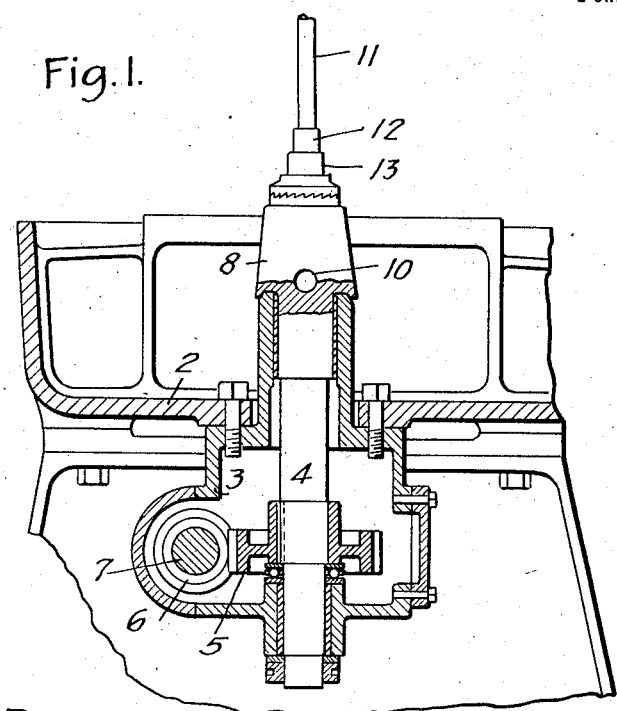
Figure 1 is a longitudinal section, partly in elevation, of the invention applied on the base of a common type of staybolt machine.

Referring to the embodiment of the invention illustrated, the bed of the machine indicated at 2 carries a casing 3 inclosing a vertical spindle 4 in suitable bearings which is driven by a worm gear 5 in engagement with a worm 6 on the shaft 7 usually extending lengthwise of the machine and driving a number of spindles 4 for a line of adjacent turning and threading machines, so that a number of blanks may be operated on at once.

The spindle 4 has a head 8 on the upper end of which the chuck is carried, the chuck having a hollow bore communicating with a central opening 9 in the head, the lower end of which communicates with downwardly inclined openings 10 for the escape of oil, dirt and any chips which may drop into the chuck.

A blank is indicated in Fig. 1 with a reduced shank 11 and an enlargement 12 on its lower end. Other shapes may, of course, be operated on. Heretofore the lower end of the blank has been provided with a squared head which dropped into a squared socket on the upper end of the spindle. This squared head has been cut off after the insertion of the bolt in a boiler, its principal or only utility being in the turning or threading of the blank. My invention does away with the necessity for such a squared head. A socket is used which will grip a head of any shape and size and which has certain special advantages in use. A socket member 13 is provided, the inside of which is formed with teeth 14 preferably ratchet shaped so that the lower end of the blank may be simply dropped into the socket and will be there gripped and turned in the desired direction; and so that the operator, seizing the comparatively slowly turning blank with his hand and turning it in the forward direction of the ratchet teeth can loosen it and lift it easily out of the socket.

Figure 2:
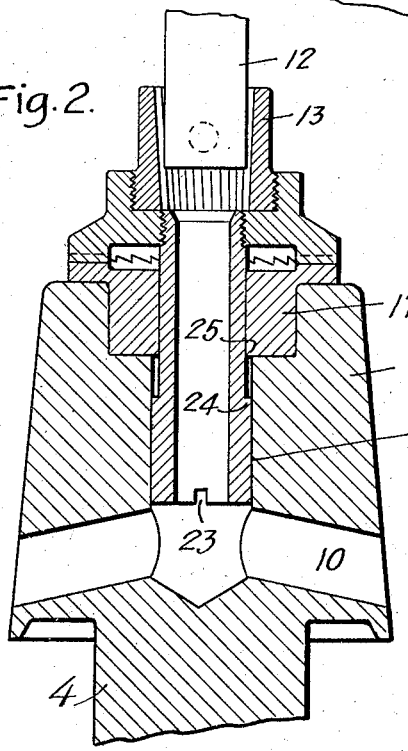
Figs. 2 and 3 are central sections showing the parts in different positions, the section line being indicated at II—II of Fig. 4.

For greater convenience in removing the work I propose to mount the socket so that it may be readily withdrawn from driving engagement with the continually rotating spindle head 8. It is screwed into a ring 15 provided with ratchet teeth on its lower face and screwed on the top of a hollow spindle 16 sliding in the opening 9 of the rotating head 8. Mounted on the head 8 is a second member 17 with ratchet teeth on its upper face adapted to engage the teeth on the opposite clutch member 15. The member 17 is engaged for rotation with the head 8 by means of pins 18 (Figs. 4 and 5) passing through these two parts and by means of bolts 19 which serve also to fasten the member 17 down on the head. At one or more points in the circumference of the members 15 and 17 they are provided with rectangular notches 20 and 21, Fig. 8. The socket member 13 is provided with a transverse hole 22. When the socket is to be withdrawn from the member 15 for repair or replacement with one of another size or the like the member 15 can be held stationary by a square tool inserted in the sockets 20 and 21, and a pin inserted in the hole 22 can then be used to turn the member 13 in the unscrewing direction. To hold the tubular member 16 stationary while screwing the part 15 thereon or removing it therefrom it is provided with a notch 23 which, in the location of the parts shown in Fig. 2 is accessible through one of the openings 10 for a suitably shaped tool.

The advantage of the clutch connection between the socket and the rotating head 8 is in stopping the rotation of the work as soon as its removal from the chuck commences, so that it shall not injure the operator's hand. Usually the operator wears a glove but even so the sharp edges of the rotating work sometimes cause injuries. With the present invention, the lifting of the work by the operator either releases it from the clutch, in which case there is no further rotating pressure on it, or if it sticks lifts the socket member with its clutch member 15 and thus relieves it of any rotating pressure. This effect may be facilitated by the provision of a shoulder 24 on the tubular member 16 which during the turning or threading work lies below the corresponding shoulder 25 on the member 17 or on some other part which turns with the head, so that when the blank is lifted and the socket member and clutch member 15 and tubular member 16 are lifted with it the striking of the shoulder 24 against the shoulder 25 will stop the upward movement of the socket member and connected parts with a shock sufficient to loosen the work in its socket so that the continued upward pull will withdraw it without the operator's having to grip it firmly.

Fig. 6 shows in addition the tubular stem 16 formed with a lower shoulder 26 against which bears a spring 27 abutting on a corresponding shoulder in the head 8. While the blank is being operated on it will always be pressed back against the resistance of the spring 27, leaving a certain play between the shoulders 24 and 25. At the end of the work the cutters or dies snap open so as to clear the blank. Thereupon the spring 27 will push the socket member 13 and connected parts up to the limit allowed by the shoulder 25 and by the slight blow against said shoulder will release the work from the grip of the socket. At the same time, of course, it will separate the two clutch members 15 and 17 so as to remove the driving force from the work.

Figure 3:
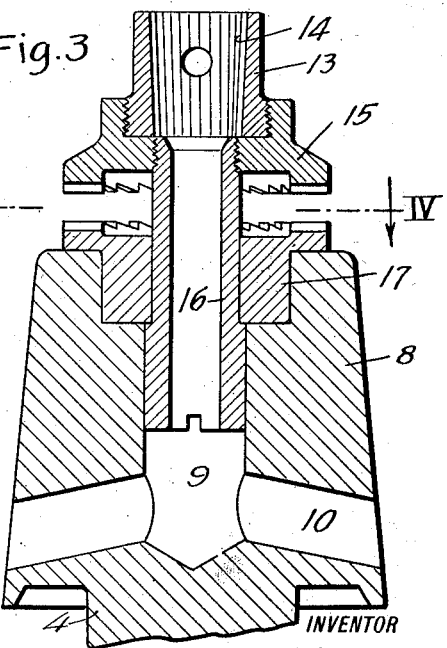

Fig. 7 shows a very much simplified design in which the socket member 13 with its tapered toothed socket 14 is fastened to the head 8, through an intermediate thimble 28 which is screwed or otherwise fixed in the head. For convenience of ejection in this case the spindle 4 has a vertical bore extending clear through its lower end and forming a continuation, of reduced diameter, of the opening 9, and an ejector rod 29 passes up through the spindle and ends normally at about the level of the bottom of the socket 14. The ejector 29 is connected at its lower end through a link 30 to a lever 31 provided with a pedal 32, so that the operator by pressing on this pedal can raise the work out of engagement with the teeth of the socket and permit its ready removal by the operator without injury. A similar ejector may be used in connection with the other constructions illustrated, as indicated for example in dotted lines in Fig. 6. But generally the provisions previously described in connection with Figs. 2, 3 and 6 will be sufficient and the forcible ejector 29 will not be needed in addition.

The socket 13 mounted on a suitable stem such as 16 may be applied to bolt machines of various other types, either with or without the ratchet connection and the other supplementary details above described, the stem 16 being made to fit any machine with which the socket is to be used and by which it is to be turned. For threading right hand bolts the spiral teeth in the socket will be right handed so as to grip the blank more firmly as the pressure becomes greater. The particular design shown is specially adapted for a known type of staybolt machines where the head 8 is provided with a socket in its upper end into which is dropped a blank and with a square recess for receiving the squared end of the blank as above described. While the invention is peculiarly useful in machines in which the chuck rotates, yet it is also available with advantage for facilitating removal of blanks from machines in which the cutters rotate while the chuck holds the blank stationary.

Though I have described with great particularity of detail certain specific embodiments of my invention yet it is not to be understood therefrom that the invention is restricted to the particular embodiments illustrated. Various modifications thereof in detail and in the arrangement of the parts may be made by those skilled in the art without departing from the invention as defined in the following claims.

What I claim is—

1. In a machine of the class described, in combination, a vertical spindle and a chuck on the upper end of said spindle; said chuck comprising a socket member with a socket adapted to grip blank-ends of various shapes and sizes, said socket having an open upper end and a comparatively wide flare so as to easily release said blanks on the lifting thereof, and a ring surrounding said socket and rotating therewith and having teeth on its lower face, said chuck being free to slide vertically and to rotate in said spindle; and the upper end of said spindle being provided with teeth adapted to engage those of said ring; whereby the socket member is clutched to and driven through the spindle when the work is held down in the chuck and whereby the lifting of the blank tends to stop this rotation and at the same operation withdraws it from the chuck so that such withdrawal may be effected quickly and without injury to the hand of the operator.

2. In a machine of the class described, in combination, a vertical spindle 4 having a central opening 9 through which oil, dirt, etc., may pass and a chuck on the upper end of said spindle and having a bore communicating with said opening 9; said chuck comprising a hollow socket member with a tapered socket adapted to grip blank-ends of various shapes and sizes and to release said blanks on the lifting thereof, a ring 15 surrounding said socket member and rotating therewith and having teeth on its lower face and a hollow spindle 16 free to slide and to rotate in said spindle 4; and a ring 17 on the upper end of the spindle 4 and rotating therewith and having teeth on its upper face adapted to engage those of the ring 15; whereby the socket member is clutched to and driven from the spindle 4 when the work is held down in the chuck and whereby the lifting of the blank stops its rotation and at the same operation withdraws it from the chuck, so that such withdrawal may be effected quickly without injury to the hand of the operator.

3. In a machine of the class described, in combination, a vertical spindle 4 having a central opening 9 through which oil, dirt, etc., may pass and a chuck on the upper end of said spindle and having a bore communicating with said opening 9; said chuck comprising a hollow socket member with a tapered socket adapted to grip blank-ends of various shapes and sizes and to release said blanks on the lifting thereof, a ring 15 surrounding said socket member and rotating therewith and having teeth on its lower face and a hollow spindle 16 free to slide and to rotate in said spindle 4; and a ring 17 on the upper end of the spindle 4 and rotating therewith and having teeth on its upper face adapted to engage those of the ring 15; whereby the socket member is clutched to and driven from the spindle 4 when the work is held down in the chuck and whereby the lifting of the blank stops its rotation and at the same operation withdraws it from the chuck so that such withdrawal may be effected quickly without injury to the hand of the operator; and an ejector 29 passing through said central opening 9 and through the bore of said chuck for forcibly separating the blank from firm engagement with the socket and allowing the easy removal thereof, the spindle 4 having also lateral downwardly inclined openings 10 communicating with the central opening 9 for escape of oil, dirt, etc., at a point above the lower end of said spindle.

4. In a machine of the class described, in combination, a vertical spindle 4 having a central opening 9 through which oil, dirt, etc., may pass and a chuck on the upper end of said spindle and having a bore communicating with said opening 9; said chuck comprising a hollow socket member with a tapered socket adapted to grip blank-ends of various shapes and sizes and to release said blanks on the lifting thereof, a ring 15 surrounding said socket member and rotating therewith and having teeth on its lower face and a hollow spindle 16 free to slide and to rotate in said spindle 4; and a ring 17 on the upper end of the spindle 4 and rotating therewith and having teeth on its upper face adapted to engage those of the ring 15; whereby the socket member is clutched to and driven from the spindle 4 when the work is held down in the chuck and whereby the lifting of the blank stops its rotation and at the same operation withdraws it from the chuck, so that such withdrawal may be effected quickly without injury to the hand of the operator; said hollow spindle 16 being adapted to strike a part of the ring 17 to limit its upward movement and to shake the blank loose from firm engagement with the socket.

In witness whereof, I have hereunto signed my name.

JAMES A. EDEN, Jr.